(12) United States Patent
Selgas

(10) Patent No.: US 11,140,173 B2
(45) Date of Patent: Oct. 5, 2021

(54) SYSTEM AND METHOD FOR SECURE ACCESS CONTROL

(71) Applicant: BAIMMT, LLC, Alexandria, VA (US)

(72) Inventor: Thomas Drennan Selgas, Athens, TX (US)

(73) Assignee: BAIMMT, LLC, Alexandria, VA (US)

( * ) Notice: Subject to any disclaimer, the term of this patent is extended or adjusted under 35 U.S.C. 154(b) by 538 days.

(21) Appl. No.: 15/937,647

(22) Filed: Mar. 27, 2018

(65) Prior Publication Data

US 2018/0288065 A1    Oct. 4, 2018

Related U.S. Application Data

(60) Provisional application No. 62/479,939, filed on Mar. 31, 2017.

(51) Int. Cl.
*H04L 29/06* (2006.01)
*H04L 29/08* (2006.01)

(52) U.S. Cl.
CPC ........ *H04L 63/105* (2013.01); *H04L 63/0884* (2013.01); *H04L 63/101* (2013.01); *H04L 63/104* (2013.01); *H04L 67/1097* (2013.01)

(58) Field of Classification Search
CPC . H04L 63/105; H04L 63/101; H04L 63/0884; H04L 63/104; H04L 67/1097
See application file for complete search history.

(56) References Cited

U.S. PATENT DOCUMENTS

| | | |
|---|---|---|
| 5,204,966 A | 4/1993 | Wittenberg et al. |
| 5,432,934 A | 7/1995 | Levin et al. |
| 5,497,421 A | 3/1996 | Kaufman et al. |
| 5,581,700 A | 12/1996 | Witte |
| 5,673,316 A | 9/1997 | Auerbach et al. |
| 5,708,777 A | 1/1998 | Sloan et al. |
| 5,719,941 A | 2/1998 | Swift et al. |
| 5,748,735 A | 5/1998 | Ganesan |
| 5,850,443 A | 12/1998 | Van Oorschot et al. |
| 5,941,947 A | 8/1999 | Brown et al. |
| 6,009,173 A | 12/1999 | Sumner |
| 6,061,448 A | 5/2000 | Smith et al. |

(Continued)

FOREIGN PATENT DOCUMENTS

EP    2 544 117    1/2013

OTHER PUBLICATIONS

Ala-Luukko Sami, Mobility Management in IEETF and GPRS Specifications, Helsinki University of Technology, May 15, 2000.

(Continued)

*Primary Examiner* — Michael R Vaughan
(74) *Attorney, Agent, or Firm* — Bass, Berry & Sims, PLC; Shu Chen

(57) ABSTRACT

Disclosed is a system and method for providing secure access control to an electronic network or device. By limiting the ability of a single administrator to act unilaterally without the agreement and/or notification of further system administrators, the data integrity and security of stored data, such as email accounts, may be enhanced and risk of compromise ameliorated. By permitting multiple administrators acting in a concert of action to access stored data, such as without notification of the email account holder, potential misconduct by email account holders may be audited.

12 Claims, 3 Drawing Sheets

(56) References Cited

U.S. PATENT DOCUMENTS

| | | | |
|---|---|---|---|
| 6,151,609 A | 11/2000 | Truong | |
| 6,161,139 A | 12/2000 | Win et al. | |
| 6,182,142 B1 | 1/2001 | Win et al. | |
| 6,223,284 B1 | 4/2001 | Novoa et al. | |
| 6,370,250 B1 | 4/2002 | Stein | |
| 6,408,336 B1 | 6/2002 | Schneider et al. | |
| 6,412,070 B1 | 6/2002 | Van Dyke et al. | |
| 6,453,353 B1 | 9/2002 | Win et al. | |
| 6,533,583 B1 | 3/2003 | Sportelli | |
| 6,571,290 B2 | 5/2003 | Selgas et al. | |
| 6,625,734 B1 | 9/2003 | Marvit et al. | |
| 6,636,973 B1 | 10/2003 | Novoa et al. | |
| 6,834,112 B1 | 12/2004 | Brickell | |
| 6,871,286 B1 | 3/2005 | Cagle et al. | |
| 6,986,049 B2 | 1/2006 | Delany | |
| 7,039,949 B2 | 5/2006 | Cartmell et al. | |
| 7,051,077 B2 | 5/2006 | Lin | |
| 7,149,893 B1 | 12/2006 | Leonard et al. | |
| 7,167,981 B2 | 1/2007 | Tanimoto | |
| 7,185,192 B1 | 2/2007 | Kahn | |
| 7,213,158 B2 | 5/2007 | Bantz et al. | |
| 7,228,437 B2 | 6/2007 | Spagna et al. | |
| 7,249,261 B2 | 7/2007 | Charbonneau | |
| 7,272,231 B2 | 9/2007 | Jonas et al. | |
| 7,299,502 B2 | 11/2007 | Schmeling et al. | |
| 7,308,580 B2 | 12/2007 | Nelson et al. | |
| 7,320,076 B2 | 1/2008 | Caronni | |
| 7,330,971 B1 | 2/2008 | Kukreja et al. | |
| 7,346,930 B1 | 3/2008 | Boydstun et al. | |
| 7,487,548 B1 | 2/2009 | Conover | |
| 7,506,010 B2 | 3/2009 | Kulkarni et al. | |
| 7,680,819 B1 | 3/2010 | Mellmer et al. | |
| 7,693,285 B2 | 4/2010 | Curry | |
| 7,761,404 B2 | 7/2010 | Chen et al. | |
| 7,765,298 B2 | 7/2010 | Villavicencio | |
| 7,865,373 B2 | 1/2011 | Punzak et al. | |
| 7,869,591 B1 | 1/2011 | Nagel et al. | |
| 7,975,292 B2 | 7/2011 | Corella | |
| 7,996,683 B2 | 8/2011 | Lyseggen et al. | |
| 8,019,085 B2 | 9/2011 | Adams et al. | |
| 8,127,149 B1 | 2/2012 | Nachenberg | |
| 8,151,112 B2 | 4/2012 | Lin | |
| 8,281,125 B1 | 10/2012 | Briceno et al. | |
| 8,296,827 B2 | 10/2012 | Paganetti et al. | |
| 8,379,857 B1 | 2/2013 | Zheng | |
| 8,379,867 B2 | 2/2013 | Selgas et al. | |
| 8,396,933 B2 | 3/2013 | Patterson | |
| 8,549,317 B2 | 10/2013 | Funayama | |
| 8,583,911 B1 | 11/2013 | Miller | |
| 8,601,263 B1 | 12/2013 | Shankar et al. | |
| 8,625,802 B2 | 1/2014 | Parann-Nissany | |
| 8,649,515 B1 | 2/2014 | Zhao et al. | |
| 8,707,034 B1 | 4/2014 | Ryan | |
| 8,737,614 B1 | 5/2014 | Mulligan | |
| 8,737,624 B2 | 5/2014 | Selgas et al. | |
| 9,767,299 B2 | 9/2017 | Selgas et al. | |
| 10,291,622 B1* | 5/2019 | Rossman | H04L 63/0876 |
| 10,523,716 B1* | 12/2019 | Stickle | H04L 63/205 |
| 2001/0055396 A1 | 12/2001 | Jevans | |
| 2002/0007453 A1 | 1/2002 | Nemovicher | |
| 2002/0095499 A1 | 7/2002 | Barnett et al. | |
| 2002/0129238 A1 | 9/2002 | Toh et al. | |
| 2003/0172262 A1 | 9/2003 | Curry | |
| 2004/0078603 A1 | 4/2004 | Ogura et al. | |
| 2004/0091114 A1 | 5/2004 | Carter et al. | |
| 2004/0103324 A1 | 5/2004 | Band | |
| 2004/0125957 A1 | 7/2004 | Rauber et al. | |
| 2004/0146164 A1 | 7/2004 | Jonas et al. | |
| 2005/0027713 A1 | 2/2005 | Cameron et al. | |
| 2005/0204030 A1 | 9/2005 | Koch et al. | |
| 2006/0026682 A1 | 2/2006 | Zakas | |
| 2006/0075258 A1 | 4/2006 | Adamson et al. | |
| 2006/0259960 A1 | 11/2006 | Kondo | |
| 2007/0022196 A1 | 1/2007 | Agrawal | |
| 2007/0033657 A1 | 2/2007 | Murakawa | |
| 2007/0250920 A1 | 10/2007 | Lindsay | |
| 2007/0255943 A1 | 11/2007 | Kern et al. | |
| 2007/0261103 A1* | 11/2007 | Viavant | G06F 21/40 726/2 |
| 2007/0282951 A1 | 12/2007 | Selimis et al. | |
| 2008/0065878 A1 | 3/2008 | Hutson et al. | |
| 2008/0104708 A1 | 5/2008 | Kerschbaum et al. | |
| 2008/0148067 A1 | 6/2008 | Sitrick et al. | |
| 2008/0162646 A1 | 7/2008 | Pizano et al. | |
| 2008/0313730 A1 | 12/2008 | Iftimie et al. | |
| 2008/0313731 A1 | 12/2008 | Iftimie et al. | |
| 2009/0064297 A1* | 3/2009 | Selgas | G06F 21/335 726/6 |
| 2009/0075630 A1 | 3/2009 | McLean | |
| 2009/0077136 A1 | 3/2009 | Igawa et al. | |
| 2009/0080650 A1 | 3/2009 | Selgas et al. | |
| 2009/0100529 A1 | 4/2009 | Livnat et al. | |
| 2009/0158037 A1 | 6/2009 | Lee et al. | |
| 2009/0198997 A1 | 8/2009 | Yeap et al. | |
| 2009/0241167 A1 | 9/2009 | Moore | |
| 2009/0259588 A1 | 10/2009 | Lindsay | |
| 2009/0300351 A1 | 12/2009 | Lei et al. | |
| 2010/0146268 A1 | 6/2010 | Van Dorsselaer et al. | |
| 2010/0161759 A1 | 6/2010 | Brand | |
| 2010/0169948 A1 | 7/2010 | Budko et al. | |
| 2010/0217987 A1 | 8/2010 | Shevade | |
| 2010/0257372 A1 | 10/2010 | Seifert | |
| 2010/0293147 A1 | 11/2010 | Snow et al. | |
| 2010/0318782 A1 | 12/2010 | Auradkar et al. | |
| 2010/0333116 A1 | 12/2010 | Prahlad et al. | |
| 2011/0238985 A1 | 9/2011 | Sovio et al. | |
| 2011/0264906 A1 | 10/2011 | Pourzandi et al. | |
| 2011/0289310 A1 | 11/2011 | Selgas et al. | |
| 2012/0117171 A1 | 5/2012 | Patterson | |
| 2012/0317414 A1 | 12/2012 | Glover | |
| 2013/0007464 A1 | 1/2013 | Madden | |
| 2013/0073854 A1 | 3/2013 | Patti et al. | |
| 2013/0114812 A1 | 5/2013 | Gidwani | |
| 2013/0156184 A1 | 6/2013 | Selgas et al. | |
| 2013/0191629 A1 | 7/2013 | Treinen et al. | |
| 2013/0254536 A1 | 9/2013 | Glover | |
| 2013/0254537 A1 | 9/2013 | Bogorad | |
| 2013/0263240 A1 | 10/2013 | Moskovitch | |
| 2013/0283060 A1 | 10/2013 | Kulkarni et al. | |
| 2013/0291056 A1* | 10/2013 | Gaudet | H04L 63/0853 726/1 |
| 2013/0305039 A1 | 11/2013 | Gauda | |
| 2013/0318347 A1 | 11/2013 | Moffat | |
| 2014/0006773 A1 | 1/2014 | Chazalet et al. | |
| 2014/0140508 A1 | 5/2014 | Kamath et al. | |
| 2014/0215210 A1 | 7/2014 | Wang et al. | |
| 2014/0281520 A1 | 9/2014 | Selgas et al. | |
| 2015/0113279 A1 | 4/2015 | Andersen et al. | |
| 2015/0220710 A1* | 8/2015 | Cherubini | G06F 21/31 726/19 |
| 2015/0378842 A1* | 12/2015 | Tomlinson | G06F 11/1469 380/28 |

OTHER PUBLICATIONS

Allman et al.; "RFC 4870—DomainKeys Identified Mail (DKIM) Signatures"; Network Working Group, IETF Trust; May 2007.

Menezes, Alfred J. et al., "Handbook of Applied Cryptography" 1997 CRC Press, LLC, pp. 31-32.

Microsoft; "Microsoft Exchange Hosted Encryption" Data sheet; Microsoft Corp.; 2006; http://www.microsoft.com/exchange/services.

Microsoft; "Sender Reputation, Microsoft TechNet, Exchange 2007"; Microsoft Corp. 2008.

Proofpoint; Encryption Made Easy: The Advantages of Identity Based Encryption:; Proofpoint, Inc., Sunnyvale, California; 2005.

Schneier, Applied Cryptography, 1996, John Willey & Sons, 2nd Edition, pp. 179-180.

Wong, M. et al; RFC 4408—Sender Policy Framework (SPF) for Authorizing Use of Domains in E-Mail, Version 1:; Network Working Group, The Internet Society; Apr. 2006.

(56) References Cited

OTHER PUBLICATIONS

Zhao, Gansen, et al. "Trusted data sharing over untrusted cloud storage providers." Cloud Computing Technology and Science (CioudCom), 2010 IEEE Second International Conference on. IEEE, 2010.
U.S. Appl. No. 12/201,150—Non-Final Office Action, dated Aug. 30, 2010.
U.S. Appl. No. 12/201,150—Final Office Action, dated Apr. 19, 2011.
U.S. Appl. No. 12/201,150—Notice of Panel Decision from Pre-Appeal Brief Review, dated Oct. 18, 2011.
U.S. Appl. No. 12/201,150—Non-Final Office Action, dated Feb. 14, 2012.
U.S. Appl. No. 12/201,150—Non-Final Office Action, dated Nov. 23, 2012.
U.S. Appl. No. 12/201,150—Final Office Action, dated Jun. 7, 2013.
U.S. Appl. No. 12/201,150—Non-Final Office Action, dated Feb. 26, 2014.
U.S. Appl. No. 12/201,150—Non-Final Office Action, dated Jun. 17, 2015.
U.S. Appl. No. 12/201,150—Final Office Action, dated Jul. 14, 2016.
U.S. Appl. No. 12/201,150—Non-Final Office Action, dated Mar. 21, 2017.
U.S. Appl. No. 12/201,150, Notice of Allowance and Examiner-Initiated Interview Summary, dated Apr. 11, 2018.
U.S. Appl. No. 13/112,931—Non-Final Office Action dated Nov. 2, 2012.
U.S. Appl. No. 13/112,931—Final Office Action dated May 15, 2013.
U.S. Appl. No. 14/203,821; Office Action dated Jul. 16, 2015.
U.S. Appl. No. 14/203,821; Final Office Action dated Mar. 1, 2016.
U.S. Appl. No. 14/203,821; Office Action dated Sep. 30, 2016.
U.S. Appl. No. 14/203,821; Notice of Allowance dated May 15, 2017.

* cited by examiner

SYSTEM AND METHOD FOR SECURE ACCESS CONTROL

CROSS-REFERENCE TO RELATED APPLICATION

This non-provisional patent application claims priority to and the benefit of U.S. Provisional Patent Application No. 62/479,939 filed Mar. 31, 2017 and entitled "SYSTEM AND METHOD FOR SECURE ACCESS CONTROL", which is hereby incorporated by reference herein in its entirety for all purposes.

FIELD

The present disclosure relates generally to a system and method for providing secure access control to an electronic network or device.

BACKGROUND

The statements in this section merely provide background information related to the present disclosure and may not constitute prior art.

The typical electronic mail (email), data storage and cloud storage systems allow a system administrator unrestricted access to users' accounts, data and credentials, including the user name, or login, and password of each user. Such access allows a system administrator to create, read, edit and delete email accounts, email messages, and/or data of any user without the user's knowledge. Such access also allows a system administrator to impersonate someone else without their knowledge; for example, a system administrator could send email messages from a user's email account, thereby giving the appearance that the user has sent the email message or the system administrator could create, read, update, and delete data from a user's cloud storage without the user's knowledge. Thus there is a need for a system and method of secure access control such as for email, data storage, and cloud storage systems as recited further herein.

SUMMARY

A secure access control system is disclosed. In various instances, the secure access control system includes a secure access processor configured to issue a first authorization in response to a first concert of action between a first system administrator connected to the secure access processor and a second system administrator connectable to the secure access processor.

The first authorization may include authorizing the first system administrator to access a secured data associated with a user device.

In various instances, the first concert of action includes at least one of (1) an authorization message is received by the secure access processor from a second system administrator, and (2) an indication by the secure access processor that a notification message is transmitted by the secure access processor to a second system administrator.

In various embodiments, the notification message includes an indication of the first authorization. Moreover, in various instances, the first authorization is denied in response to the second system administrator not being connected from the secure access processor.

Moreover and also as described herein, a system and method for securing access to a user's electronic mail account is provided.

In addition, a system and method for securing access to a user's electronic data storage is provided.

Also, a system and method for securing access to a user's cloud storage account substantially as described herein is provided.

A secure access control system is provided. The system may have a secure access processor. The secure access processor may be configured to issue a first authorization in response to a first concert of action between a first system administrator connected to the secure access processor and a second system administrator connectable to the secure access processor. In various embodiments, the first authorization includes authorizing the first system administrator to access a secured data associated with at least one of a user, a user device, and an access session. In various instances, the first concert of action includes at least one of an authorization message is received by the secure access processor from the second system administrator, and an indication by the secure access processor that a notification message is transmitted by the secure access processor to the second system administrator. The notification message may include an indication of the first authorization. The system may also include wherein the first authorization is denied in response to the second system administrator connectable to the secure access processor not being connected to the secure access processor.

In various instances, the secured data is electronic mail. In further instances, the secured data is a limited access electronic resource including electronic cloud data storage.

The first authorization may be granted in response to receiving by the secure access processor a message from the second system administrator. Also, the accessing the secured data by the first system administrator may include changing a user credential in the secured data. Moreover, the accessing the secured data by the first system administrator may include resetting a user credential in the secured data.

In various instances, the secure access processor issues the first authorization in response to the first concert of action, the first concert of action including a secure access control method. The method may include setting an Administrator Integrity Count of an administrator counter of a privilege coordinator of the secure access control processor, the Administrator Integrity Count being a preset minimum number of system administrators. The method may include authenticating a plurality of system administrators to the secure access control system. The method may also include verifying a data access rule for each system administrator of the plurality of system administrators, in an administrative privileges database, by an access gating engine of the secure access control processor, and counting, by the administrator counter of a coordination engine of the secure access control processor, the plurality of system administrators, and determining a count being at least the Administrator Integrity Count. In various instances, the count indicates satisfaction of the first concert of action, the first concert of action including a number of system administrators being connected to the secure access control system being at least the Administrator Integrity Count.

In various instances, the first authorization further includes permitting the first system administrator to change the secured data and further in response to the determining notifying the second system administrator of the permitting. Moreover, the first authorization may include permitting the first system administrator to access a user credential in the secured data via a credential change controller. Furthermore, the first authorization may include permitting the first system administrator to access a limited access electronic resource via a limited access electronic resource supervisor. Moreover, the first authorization may include permitting the first system administrator to revert a user credential in the secured data to a previous value via a credential reversion engine. Additionally, the first authorization may include logging, via a logging module, a change to a user credential.

A method of secure access control is provided. The method may include various steps. For instance, the method may include setting an Administrator Integrity Count of an administrator counter of a privilege coordinator of a secure access control processor, the Administrator Integrity Count being a preset minimum number of system administrators. The method may include authenticating a plurality of system administrators to a secure access control system. Moreover, the method may include counting, by the administrator counter of a coordination engine, the plurality of system administrators, and determining a count being at least the Administrator Integrity Count. In various instances, the method may include, in response to the determining, issuing a first authorization to a first system administrator, and further in response to the determining, notifying a second system administrator of the permitting.

The method may also include verifying a data access rule for each system administrator of the plurality of system administrators, in an administrative privileges database by an access gating engine of the secure access control processor, and wherein the first authorization includes permitting the first system administrator to access a user credential allowed by the data access rule, via a credential change controller.

In various instances, the first authorization includes permitting the first system administrator to access a limited access electronic resource via a limited access electronic resource supervisor. Moreover, the first authorization may include permitting the first system administrator to revert a user credential to a previous value via a credential reversion engine. Furthermore, the method may contemplate logging, via a logging module, a change to a user credential.

A non-transitory computer readable storage medium is provided. The medium may have stored computer code that causes a computer system to perform a secure access control method, the computer system including at least one computer and at least one storage medium, accessible by the at least one computer, in which is stored the secure access control method, the computer code to perform the method. The method may include setting an Administrator Integrity Count of an administrator counter of a privilege coordinator of a secure access control processor, the Administrator Integrity Count being a preset minimum number of system administrators. The method may include authenticating a plurality of system administrators to a secure access control system. The method may also include counting, by the administrator counter of a coordination engine, the plurality of system administrators, and determining a count being at least the Administrator Integrity Count. In various instances, the method includes, in response to the determining, issuing a first authorization to a first system administrator, and further in response to the determining, notifying a second system administrator of the permitting.

In various instances, the non-transitory computer readable storage medium in which is stored computer code that causes the computer system to perform the secure access control method includes a method that also contemplates verifying a data access rule for each system administrator of the plurality of system administrators, in an administrative privileges database by an access gating engine of the secure access control processor, and wherein the first authorization includes permitting the first system administrator to access a user credential allowed by the data access rule, via a credential change controller.

Finally, the non-transitory computer readable storage medium in which is stored computer code that causes the computer system to perform a secure access control method may include a method also wherein the first authorization includes permitting the first system administrator to access a limited access electronic resource via a limited access electronic resource supervisor.

BRIEF DESCRIPTION OF THE DRAWINGS

For a more complete understanding of various embodiments of the present disclosure and the advantages thereof, reference is now made to the following brief description, taken in connection with the accompanying drawings and detailed description, wherein like reference numerals represent like parts, and in which.

DETAILED DESCRIPTION

Figure 1:
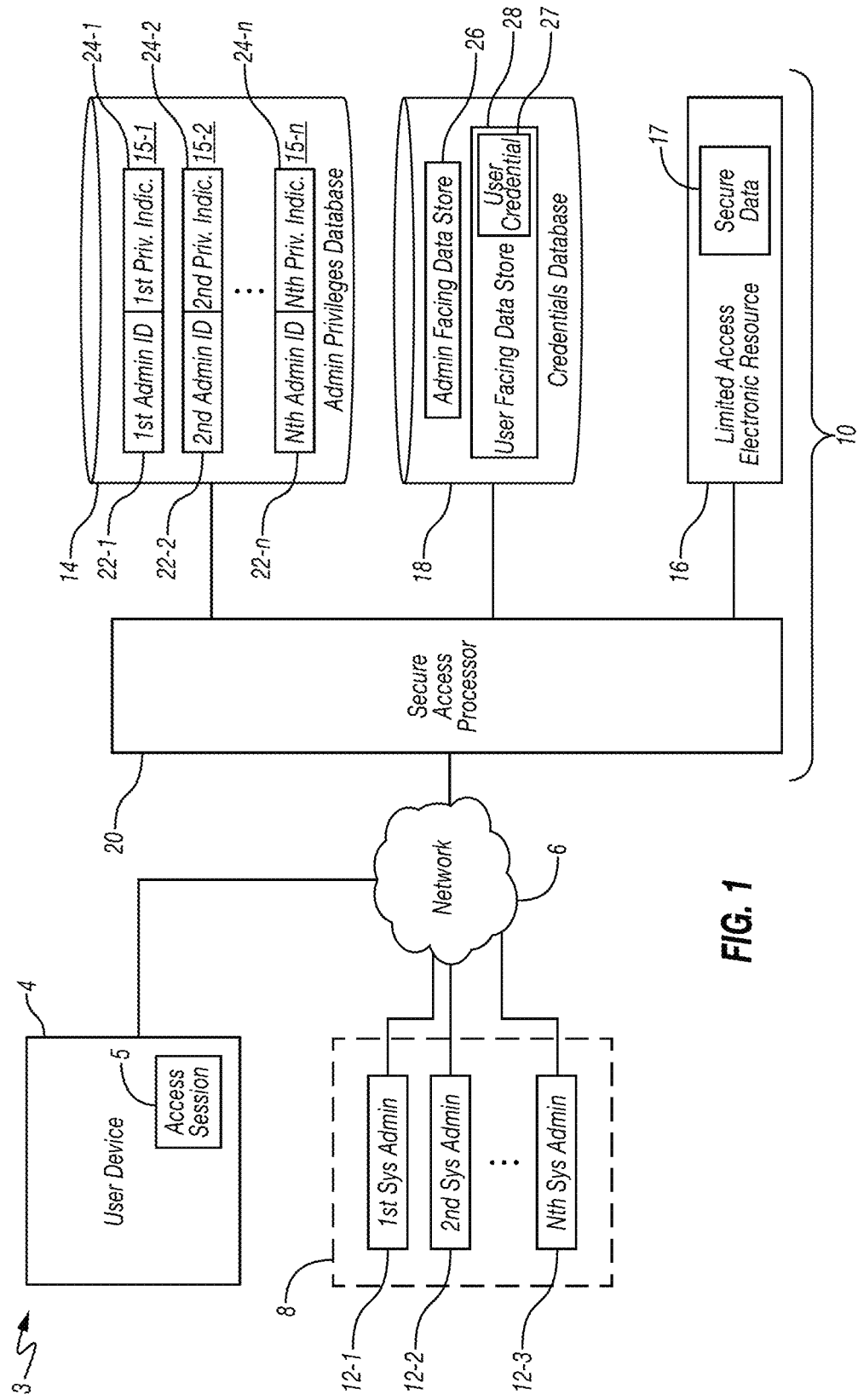
FIG. 1 illustrates a secure access control system operating within a context environment, according to various embodiments.

The present disclosure is generally described in detail with reference to embodiments illustrated in the drawings. However, other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, specific details, and the like have been omitted inasmuch as such details are not considered necessary to obtain a complete understanding of the present invention, and are considered to be within the understanding of persons of ordinary skill in the relevant art.

Recent developments in secure credentials control have led to various ways to secure access to an account of a user. For instance, various related systems and methods for secure credentials control are provided in pages 3-17 of U.S. patent application Ser. No. 12/201,150, entitled "SECURE CREDENTIALS CONTROL METHOD" and filed on Aug. 29, 2008, which is incorporated by reference herein. For instance, various systems and methods of secure access control as discussed herein may be applied to the secure credentials control method incorporated by reference.

A secure access control method ameliorates the risk of unrestricted access to users' email accounts, data storage or cloud storage by a single system administrator. In an embodiment, a single system administrator is prevented from resetting or changing the credentials of a user's private data, such as an email account, thereby denying a single system administrator access to the user's private data, such as an email of an email account. In an embodiment, two or more system administrators acting in concert may reset or change the credentials associated with the user such as the credentials associated with the user's private data, such as an email account, thereby allowing a system administrator access to the user's private data, such as data of an email account, only upon a concerted action of a plurality of system administrators. For example, upon a preset minimum number of system administrators being connected to a system, a system administrator may be permitted to instantiate a change to a user's credential or instantiate a change to a user's private data, such as an email account, or instantiate an attempt to access a user's private data, such as an email account. A message may then be sent to one or more additional system administrators advising of this change and soliciting consent, or in various instances advising of this change and offering an opportunity to reject the desired access.

Moreover, such a method permits access to user email account contents by system administrators, for instance, to access the company email account of an employee engaging in misconduct contrary to email account use policies, and yet further ameliorating the risk of misconduct by system administrators by only permitting such access upon the concerted action of more than one system administrator. For example, a single system administrator is prevented from reading or accessing user's private data, such as an email account, thereby denying a single system administrator access to the user's private data, such as an email account. In an embodiment, two or more system administrators acting in concert may read or access a user's private data, such as an email account, thereby allowing system administrator access to the user's private data, such as an email account only upon a concerted action of a plurality of system administrators. For example, upon a preset minimum number of system administrators being connected to a system, an administrator may be permitted to instantiate an attempt to access a user's private data, such as an email account. A message may then be sent to one or more additional system administrators advising of this attempted access and soliciting consent, or in various instances advising of this attempted access and offering an opportunity to reject the desired access.

As apparent from the two above scenarios, the efficient and secure functioning of the computer network and network devices are improved. On the one hand, security and data integrity are enhanced, and yet on the other hand, flexible access, including covert access, credential reset, and credential management is permitted. In this manner, the usability of the network and network devices is maintained and enhanced while the data integrity and potential for network or device compromise, such as by automated scripts is further ameliorated.

In an embodiment, "N" number of system administrators from a group of "X" number of system administrators, where "X" greater than or equal to "N", and wherein "N" is greater than or equal to two, acting in concert may reset or change the credentials of a user's private data, such as an email account and/or access the contents of a user's private data, such as an email account thereby allowing system administrator access to the user's private data, such as an email account only upon a concert of actors.

In an embodiment, a single system administrator is prevented from resetting or changing the credentials of a user's data and/or cloud storage account, thereby denying a single system administrator access to the user's data and/or cloud data. In an embodiment, two or more system administrators acting in concert may reset or change the credentials of a user's data and/or cloud storage account, thereby allowing system administrator access to the user's cloud data. In an embodiment, "N" number of system administrators from a group of "X" number of system administrators, where "X" greater than or equal to "N", acting in concert may reset or change the credentials of a user's cloud storage account, thereby allowing system administrator access to the user's data and/or cloud data.

In an embodiment, the two or more system administrators may access a user's account by changing a user's credentials and after said access the system administrators may be allowed to change the credentials back to the user's original credentials. This provision prevents a user from knowing that the system administrators accessed the user's account by temporarily resetting the user's credentials and then changing the credentials back without the user's knowledge. In this manner, service continuity and user login procedures are maintained without interruption due to the access by the system administrators. Moreover account audits are facilitated without needing user interaction, such as allowing automated or manual access to resources within the user's account such as for data audits, security scanning processes, monitoring of user account holder misconduct, and/or the like.

The secure access control method, in an embodiment, tracks which system administrators, acting in concert or attempting to act unilaterally, accessed a user's account. Firstly, each time the credentials of a user's account are reset, or the account is reactivated, the date and time of the reset or reactivation event may be recorded in a secure table that any system administrator or designated system administrators may inspect. Secondly, the system may send a notification message via email, text message, or the like, to a select group of two or more system administrators, notifying said system administrators of the dates and times of each reset and/or reactivation event for the user's account.

With reference now to FIG. 1, a secure access control system 10 may operate within a context environment 2. A context environment 2 comprises the real-world variables, constraints, structures, systems, and the like within which a secure access control system 10 operates. For example, a context environment 2 may comprise an operative scenario wherein secure access is desired and includes users having user devices 4, a system administrator set 8 made up of system administrators, such as a first system administrator 12-1, a second system administrator 12-2, or a Nth system administrator 12-*n*, of the secure access control system 10, as well as the secure access control system 10 itself. The context environment 2 may contain other users, other networks and other devices and may be secure or unsecure, such as being a distributed worldwide interne environment, or including a closed intranet environment, or including a combination of open and closed environments wherein devices, systems, and individuals interact.

A user device 4 may comprise a terminal device or other access mechanism whereby a user 3 may interoperate with the secure access control system 10 such as to transceiver data with a limited access electronic resource 16, for instance, secure email. The user device 4 may receive data regarding the operation of the secure access control system 10, and provide instructions to the secure access control system 10 regarding current or future operation and changes to operation. In various instances, a user device 4 may comprise a browser session, such as on an internet browser of a computer. In further instances, a user device 4 may comprise a dedicated hardware device, or may comprise a smart phone running a browser session or an independent application, and/or the like. The user device 4 may instantiate an access session 5 wherein the user device 4 is authenticated to the secure access control system 10. In various instances, the access session 5 includes a mechanism for confirming access authorization of the user device 4. The mechanism may comprise a cryptographic key, a password, biometric information, a physical token and/or dongle, a hardware address such as a MAC address, and/or the like.

A system administrator set 8 may comprise a plurality of system administrators 12. For example, a system administrator set 8 may include a first system administrator 12-1, a second system administrator 12-2, and any number N of system administrators, such as a Nth system administrator 12-n, n being a value within the set of 2 to N, inclusive. The system administrator set 8 generally comprises no less than two system administrators. In various embodiments, a system administrator may comprise a script, a software module, an electronic agent operative in a processor, and/or a logical structure configured for interaction with a human. In further embodiments, a system administrator comprises a user device having elevated access privileges versus those associated with a typical user device 4. A system administrator may comprise the combination of a user and a user device, or a user and at least one of a script, software module, electronic agent operative in a processor, and/or a logical structure configured of interaction with a user who are cooperatively operating.

The user device 4 and each system administrator 12-1, 12-2, 12-n of the system administrator set 8 may be in electronic communication with a communication interface 6. Communication interface 6 is further in electronic communication with a secure access control system 10. Moreover, while various interconnections between a secure access processor 20 and other aspects of the secure access control system 10 are depicted in FIG. 1 as direct electronic or logical connections separate from communication interface 6, one may appreciate that these connections may also be, in whole or in part, an aspect of communication interface 6. Moreover, a portion of each aspect of the secure access control system 10 may be located within communication interface 6 and/or distributed throughout various aspects or resources of communication interface 6, so that the visual depiction in FIG. 1 of the various aspects of the secure access control system 10 as a separate from the communication interface 6 are for convenience only and not intended to limit the secure access control system 10 from arrangement in cloud-based or other operative structures, as desired.

Referring now to the secure access control system 10, a secure access control system 10 comprises an electronic system configured to selectively permit system administrators access to data associated with a user 3. The user 3 may access the data via a user device 4 operating an access session 5 having credentials. In various instances, system administrators 12-1, 12-2, 12-n may desire to alter the access session 5 such as by changing the credentials associated with the user device 4 and/or may further desire to access the private data 17 associated with the user 3. In various instances, a secure access control system 10 stores the data associated with the user 3 (private data 17) in a limited access electronic resource 16 aspect of the secure access control system 10, although in further instances, the limited access electronic resource 16 may be separate from the secure access control system 10, such as provided by a remote and/or cloud resource.

The secure access control system 10 may comprise an administrative privileges database 14. An administrative privileges database 14 may comprise a repository of data access rules 15-1, 15-2, 15-n associated with individual system administrators 12-1, 12-2, 12-n of the system administrator set 8. In various instances a data access rule is associated with each system administrator, although in further embodiments, only a subset of system administrators are associated with a data access rule. For example a first data access rule 15-1 may be associated with a first system administrator 12-1, a second data access rule 15-2 may be associated with a second system administrator 12-2, and an Nth data access rule 15-n may be associated with an Nth system administrator 12-n. Data access rules 15-1, 15-2, 15-n may include indicia of different types of data a system administrator 12-1, 12-2, 12-n is allowed or disallowed access to, indicia of different types of access a system administrator 12-1, 12-2, 12-n has to data, such as viewing, changing, reverting to a previous value, reverting to a previous value but not otherwise changing, deleting, copying, creating, adding, and/or the like. The specific aspects of data access rules will be discussed further herein.

The secure access control system 10 may comprise a credentials database 18. A credentials database 18 may comprise a repository of the credentials associated with an access session 5 of a user device 4. For instance, a credentials database 18 may include data representative of the correct challenge response, key, unique identifier, etc. that would authorize an access session 5 to read and/or write private data 17 in a limited access electronic resource 16.

The secure access control system 10 may comprise a limited access electronic resource 16. A limited access electronic resource 16 may comprise data belonging to a user and desired to be accessed by a user operating a user device 4 having an access session 5 instantiated therein. For instance, a limited access electronic resource 16 may include private data 17. This private data 17 may comprise email, a control session such as to control an Internet-of-Things device, a repository of files, and/or any non-publically accessible data.

Finally, a secure access control system 10 may comprise a secure access processor 20. While various aspects of an example secure access processor 20 will be discussed elsewhere herein, a secure access processor 20 may comprise an electronic processor and memory configured to direct the interchange of data among the user device 4, at least one system administrator 12-1, 12-2, 12-n of the system administrator set 8, communication interface 6 resources, as well as the administrative privileges database 14, the credentials database 18 and the limited access electronic resource 16. In this manner the security and data integrity of the databases may be maintained. In various embodiments, the secure access processor 20 is configured to issue a first authorization comprising authorizing a system administrator 12-1, 12-2, 12-n to access private data 17 associated with a user device 4 in response to a first concert of action. The first concert of action may comprise at least an authorization message received by the secure access processor 20 from a second system administrator 12-1, 12-2, 12-n. The first concert of action may further comprise an indication that a notification message comprising an indication of the first authorization is transmitted to a second system administrator 12-2, 12-2, 12-*n*.

Having discussed each aspect of the secure access control system 10, focused attention is directed to the administrative privileges database 14. As mentioned, the administrative privileges database 14 comprises data access rules 15-1, 15-2, 15-*n*. Each data access rule 15-1, 15-2, 15-*n* comprises an administrator ID, such as a first administrator ID 22-1, a second administrator ID 22-2, or any number N of administrator IDs such as N$^{th}$ administrator ID 22-*n*. Similarly, each data access rule comprises a privilege indicator, such as a first privilege indicator 24-1, a second privilege indicator 24-2, or any number N of privilege indicators such as N$^{th}$ privilege indicator 24-*n*.

An administrator ID, such as a first administrator ID 22-1, a second administrator ID 22-2, and an N$^{th}$ administrator ID 22-*n* may comprise a unique identifier corresponding to the identity of a system administrator. For instance, the first administrator ID 22-1 may comprise an unique identifier, such as a text string, a numerical value, a hexadecimal value, an integer value, a bit mask, and/or the like uniquely corresponding to the first system administrator 12-1. Similarly, the second administrator ID 22-2 may comprise an unique identifier, such as a text string, a numerical value, a hexadecimal value, an integer value, a bit mask, and/or the like uniquely corresponding to the second system administrator 12-2. Moreover, any number N such as a N$^{th}$ administrator ID 22-*n* may comprise an unique identifier, such as a text string, a numerical value, a hexadecimal value, an integer value, a bit mask, and/or the like uniquely corresponding to the N$^{th}$ administrator ID 22-*n*.

A privilege indicator, such as a first privilege indicator 24-1, a second privilege indicator 24-2, and an N$^{th}$ privilege indicator 24-*n* may comprise a flag corresponding to the access limits restricting the access of the system administrator 12-1, 12-2, 12-*n* to the private data 17 in the limited access electronic resource 16 and the data in an administrator facing data store 26 and/or user facing data store 28 of the credentials database 18. For instance, the privilege indicators 24-1, 24-2, and 24-*n* may each comprise a flag indicating authorization to view, change, revert to a previous value, revert to a previous value but not otherwise delete, copy, create, and/or take any action with respect to data within the credentials database 18, and/or with respect to data within the limited access electronic resource 16, such as private data 17. While this is only one example of a privilege flag, any other combination of these or other privileges may be contemplated, as desired.

For example, a first system administrator 12-1 may only be permitted to view private data 17 associated with a user, user device, or access session 5 in a limited access electronic resource 16 in response to a first concert of action with a second system administrator 12-2, but may be permitted to take other actions independently, such as to create a new user credential 27 associated with a new access session 5 of a new user device 4 of an existing user 3.

For further example, a first system administrator 12-1 may only be permitted to change a credential associated with an access session 5 in concert with a second system administrator 12-2, but may be permitted to take other actions independently, such as to create a new credential associated with a new access session 5 of a new user device 4.

All such rules are stored in the administrative privileges database 14 as privilege indicators associated with administrator IDs. For instance, such rules for the first system administrator 12-1 are stored in the administrative privileges database 14 as first privilege indicators 24-1 associated with a first administrator ID 22-1 which are both aspects of a first data access rule 15-1.

Attention is now directed to the credentials database 18. A credentials database 18 may comprise a repository of user credentials 27 associated with a user 3, user device 4, and/or user access session 5 configured to permit a user access session 5 to access the private data 17 within the limited access electronic resource 16. In various instances, the credentials database 18 includes an administrator facing data store 26 and a user facing data store 28. The user facing data store 28 comprises data accessible to the user device 4, such as a user credential 27. The administrator facing data store 26 comprises data accessible to at least one system administrator 12-1, 12-2, 12-*n* of the system administrator set 8. For example, the user facing data store 28 may comprise a user credential 27 associated with a user access session 5, such as a user password. In various instances, one or more system administrator 12-1, 12-2, 12-*n* may be permitted to change a password, but not to view the current password. In such a scenario, the administrator facing data store 26 would exclude a human readable form of the user password, but would instead include a pointer, token, or the like that would enable a system administrator 12-1, 12-2, 12-*n* to selectively change the specific password but not read the currently stored value of the password in the user facing data store 28.

In further instances, the administrator facing data store 26 may comprise an piecewise bitmask or other mechanism whereby different system administrators 12-1, 12-2, 12-*n* only have access to a portion of the data necessary to interact with the user facing data store 28, such as only having a portion of the data necessary to change a user credential 27, such as user's password, and must act in concert to achieve the change.

In still further instances, the administrator facing data store 26 may comprise a piecewise bitmask or other mechanism whereby different system administrators only have access to a portion of the data necessary to interact with the private data 17 linked to a specific user 3, user device 4, or access session 5. For instance, the user facing data store 28 may contain indicia of a link ("User Account Identifier") between an access session 5 and a particular email account stored in the private data 17 of the limited access electronic resource 16. Two different tokens (a first token and a second token) may be required for any system administrator 12-1, 12-2, 12-*n* to access this private data 17. The administrator facing data store 26 may comprise a record corresponding to User Account Identifier and contain the first token and the second token. In various instances, a first system administrator 12-1 is permitted access to the first token only, while a second system administrator 12-2 is permitted access only to the second token only, wherein the first token and second token are non-identical. As such, the bifurcation of data within the credentials database 18 ameliorates a risk that a single system administrator 12-1, 12-2, 12-*n* gain access to the private data 17, or to the user credential 27 within the user facing data store 28, without a concert of action with another system administrator 12-1, 12-2, 12-*n*. In further instances, this bifurcation is accomplished not by bitmasking, or multiple tokens, or having only a portion of necessary data, but by a challenge and response query sent to another system administrator 12-1, 12-2, 12-*n* who must respond before the bitmask, token, or necessary data is applied in order to gain the desired access. In yet further instances, this bifurcation is accomplished by a requirement that a preset minimum number of system administrators 12-1, 12-2, 12-*n* are situated to be capable of receiving communication from the secure access control system 10 (e.g., "connected to the secure access control system 10"), and a notification is sent at least a subset of the preset minimum number of system administrators 12-2, 12-2, 12-*n* so that no one system administrator may act in secret.

Figure 2:
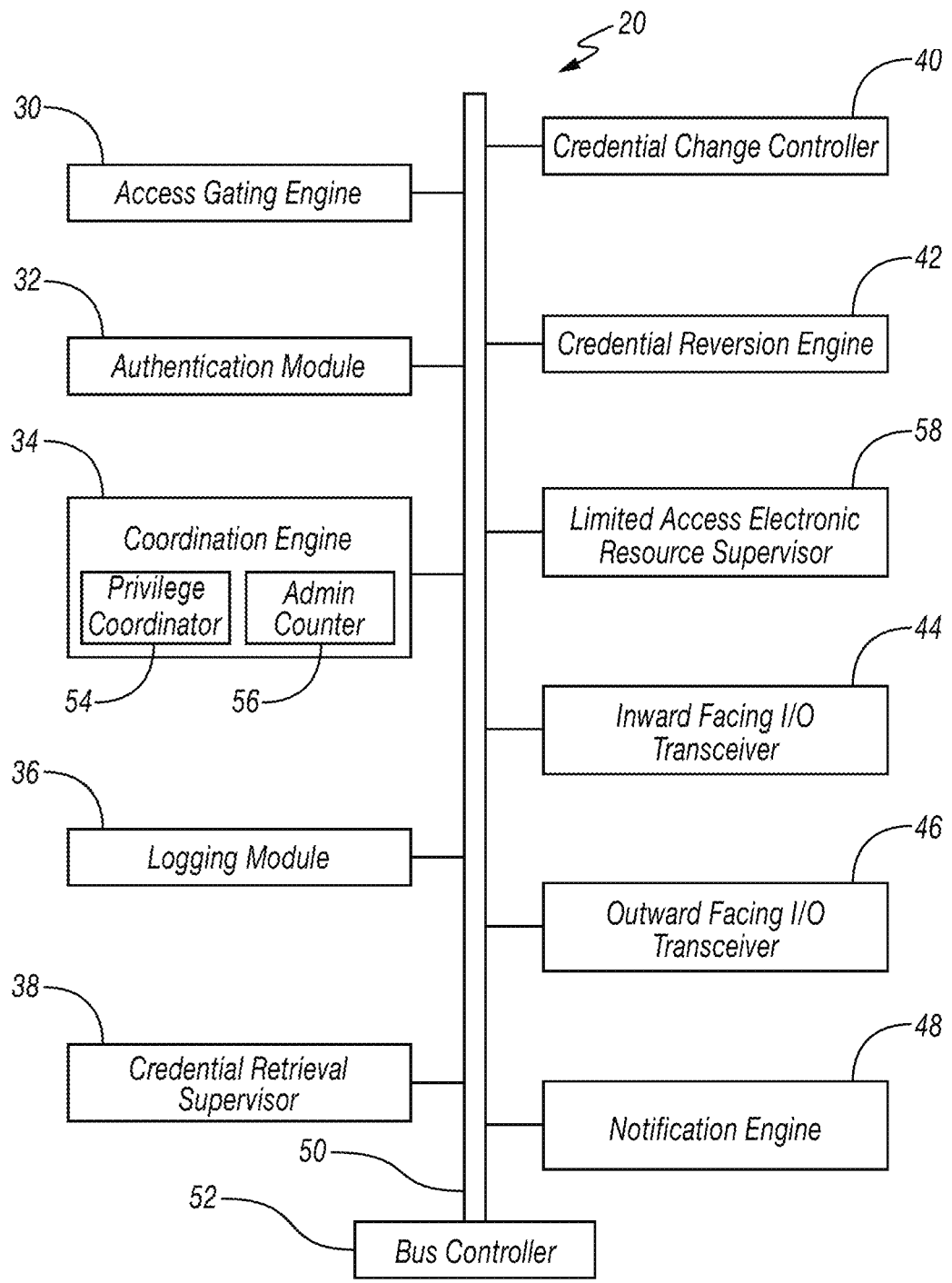
FIG. 2 illustrates various aspects of a secure access processor of a secure access control system according to FIG. 1.

Having discussed aspects of the secure access control system 10, continued attention is directed at FIG. 1 and further attention directed toward FIG. 2 for a discussion of specific aspects of the secure access processor 20.

In various instances, a secure access processor 20 comprises a plurality of engines, modules, controllers, transceivers, supervisors, and/or the like connected in operative communication on a secure access bus 50. As used herein, an engine, module, controller, transceiver, or supervisor all refer to a logical or physical subcomponent of the secure access processor 20. The word choice "engine," "module," "controller," "transceiver," or "supervisor" is not meant to differentiate the features or capabilities of the engine, module, controller, transceiver, or supervisor from each other, but is provided for enhanced readability.

As used herein, a secure access bus 50 may comprise a physical bus, or may comprise a logical bus resident in the secure access processor 20. The intercommunication among aspects of the secure access processor 20 with each other, as well as with external resources connected to the secure access processor 20, such as the administrative privileges database 14, the limited access electronic resource 16, the credentials database 18, and the communication interface 6, are controlled by a bus controller 52 configured to direct communication on the secure access bus 50.

Moreover, the bus controller 52 may comprise a logical unit of the secure access processor 20 configured to direct communications between and among the different engines, modules, controllers, transceivers, supervisors connected to the secure access bus 50 and similarly among the bus controller 52 and external aspects.

The secure access processor 20 may comprise an access gating engine 30. An access gating engine 30 may receive an access request from a system administrator, such as a first system administrator 12-1, a second system administrator 12-2, or an Nth system administrator 12-*n* to access data in the credentials database 18 or the limited access electronic resource 16. The access gating engine 30 may retrieve an access rule, such as a first data access rule 15-1, a second data access rule 15-2, or an Nth data access rule 15-*n* from the administrative privileges database 14 by matching the requesting system administrator 12-1, 12-2, 12-*n* to an administrator ID 22-1, 22-2, 22-*n* associated with a data access rule 15-1, 15-2, 15-*n*. Upon retrieval of the data access rule 15-1, 15-2, 15-*n*, the access gating engine 30 may load the privilege indicator 24-1, 24-2, 24-*n* associated with the data access rule 15-1, 15-2, 15-*n*. For instance, in response to a first data access rule 15-1 being loaded, the first privilege indicator 24-1 is retrieved, and similarly for the second data access rule 15-2 being loaded, the second privilege indicator 24-2 is retrieved, and similarly for the Nth data access rule 15-*n* the Nth privilege indicator 24-*n* is retrieved. If the privilege indicator 24-1, 24-2, 24-*n* indicates that the access request is within the subset of actions that the specific system administrator 12-1, 12-2, 12-*n* is authorized to perform, then the access gating engine 30 grants the requested access.

The secure access processor 20 may comprise an authentication module 32. The authentication module 32 may load a user credential 27 from the user facing data store 28 of the credentials database 18 and confirm that the user 3, user device 4, and access session 5 is presenting a valid session credential corresponding to the user credentials 27. In response to the presentation of a valid session credential, the access session 5 is permitted access to private data 17 reposed in the limited access electronic resource 16, and/or access the user facing data store 28 of the credentials database 18.

Similarly, the authentication module 32 may determine whether a purported system administrator 12-1, 12-2, 12-*n* is an actual system administrator 12-1, 12-2, 12-*n* and allow or disallow an attempted connection of the purported system administrator 12-1, 12-2, 12-*n* to the secure access processor 20.

The secure access processor 20 may comprise a coordination engine 34, configured to evaluate the concert of action for compliance with the secure access processor 20 operative principles. The coordination engine 34 may further comprise a privilege coordinator 54 and an administrator counter 56. The coordination engine 34 may coordinate the access request of a system administrator 12-1, 12-2, 12-*n* with one or more additional system administrator 12-1, 12-2, 12-*n* so that the access request is only fulfilled upon a first concert of action between/among multiple system administrators 12-1, 12-2, 12-*n*. For example a first system administrator 12-1 may request to reset a user credential 27 associated with a user 3, user device 4, and/or access session 5. For example, a user 3 may have forgotten a password and wish to have the password reset. For further example, a first system administrator 12-1 may request to obtain access to private data 17 associated with a user 3, a user device 4, and/or an access session 5 which is located in the limited access electronic resource 16. For instance, a user 3 may be suspected of engaging in unauthorized activity within the context environment 2 and a review or audit of the private data 17 associated with the user 3, the user device 4, and/or the access session 5 may be desired. In various instances, the granting of access to the private data 17 to a system administrator 12-1, 12-2, 12-*n* happens without the user's knowledge. In various instances, the granting of access to the private data 17 to a system administrator 12-1, 12-2, 12-*n* happens only upon a first concert of action between/among a first system administrator 12-1 and second system administrator 12-2, or any greater number N of Nth system administrators 12-*n* as desired.

In each instance, the coordination engine 34 coordinates the access request of the first system administrator 12-1 with a second system administrator 12-2 so that no one system administrator, such as first system administrator 12-1, can unilaterally access private data 17. Similarly, the coordination engine 34 coordinates the access request of the first system administrator 12-1 with a second system administrator 12-2 so that no one system administrator, such as first system administrator 12-1, can unilaterally access or reset or otherwise obtain or change a user credential 27. Specifically, the privilege coordinator 54 may interoperate with the access gating engine 30 as discussed above to determine the first privilege indicator 24-1 associated with the first system administrator 12-1 and to determine the second privilege indicator 24-2 associated with the second system administrator 12-2. The coordination engine 34 determines whether the first privilege indicator 24-1 and second privilege indicator 24-2 comprise flags that, when combined, indicate an authorization to take the desired action. As such, the flags associated with the privilege indicator of a single system administrator 12-1, 12-2, 12-*n* are insufficient to indicate authorization to perform the action, whereas the flags of one system administrator 12-1, 12-2, 12-*n* when combined with the flags of another system administrator 12-1, 12-2, 12-*n* indicate the requisite necessary privileges. In various embodiments, any combination of a set number of system administrators 12-1, 12-2, 12-*n* greater than one is sufficient, whereas in further embodiments, only specific system administrators 12-1, 12-2, 12-*n* have a privilege indicator 24-1, 24-2, 24-*n* indicating authorization to access the private data 17 or user credential 27 or interoperate with another system administrator 12-1, 12-2, 12-*n* to access the private data 17 or user credential 27. For instance, some system administrators 12-1, 12-2, 12-*n* may access the private data 17 of a user only upon a first concert of action with three additional system administrators, whereas in further instances, some other system administrators 12-1, 12-2, 12-*n* may access the private data 17 of a user 3 only upon a first concert of action with one additional system administrator 12-1, 12-2, 12-*n*. In still further instances, a first system administrator 12-1 may access the private data 17 of a certain user upon a first concert of action with additional system administrator(s) 12-1, 12-2, 12-*n* but not the private data 17 of other users 3, such as other system administrators 12-1, 12-2, 12-*n* themselves who may have private data 17. In further instances, the flag associated with the privilege indicator of a single system administrator 12-1, 12-2, 12-*n* is sufficient to indicate authorization to perform the action, however a challenge and response sequence is presented, such as via the notification engine 48, to another system administrator 12-1, 12-2, 12-*n* prior to permitting the action to occur. In yet further instances, the flag associated with the privilege indicator of a single system administrator 12-1, 12-2, 12-*n* is sufficient to indicate authorization to perform the action, however a notification is presented, such as via the notification engine 48, to a preset minimum number (the Administrator Integrity Count as discussed below) of additional system administrators 12-1, 12-2, 12-*n* concurrent with permitting the action to occur.

Moreover, in various instances, the flags associated with the privilege indicator of a system administrator 12-1, 12-2, 12-*n* may be altered to prevent the system administrator 12-1, 12-2, 12-*n* from receiving any notifications, and/or being queried to provide any authorizations of other system administrators 12-1, 12-2, 12-*n* to perform any actions, and/or from being permitted to perform one or more action, such as in response to the system administrator 12-1, 12-2, 12-*n* being investigated for misconduct. Moreover, in response to the system administrator 12-1, 12-2, 12-*n* being investigated for misconduct, the flags associated with the privilege indicator of the system administrator 12-1, 12-2, 12-*n* may be altered to prevent the system administrator 12-1, 12-2, 12-*n* from receiving any notifications, and/or being queried to provide any authorizations of other system administrators 12-1, 12-2, 12-*n* to perform any actions, and/or from being permitted to perform one or more action, wherein the actions relate to the investigation of the system administrator for misconduct. For instance, the actions may include access to the credentials of the system administrator 12-1, 12-2, 12-*n* and/or the personal or private data of the system administrator 12-1, 12-1, 12-*n*.

The coordination engine 34 further comprise as an administrator counter 56. An administrator counter 56 comprises an engine configured to store a value representative of the number of system administrators 12-1, 12-2, 12-*n* solicited by the privilege coordinator 54 of the coordination engine 34 and determine that the number of system administrators 12-1, 12-2, 12-*n* solicited and who have sufficient privileges according to their privilege indicator(s) 24-1, 24-2, 24-*n* is greater than or equal to a preset minimum number ("Administrator Integrity Count"). The Administrator Integrity Count may be set to a value such as two or three or four or any value as desired during the setup of the secure access control system 10, or may be represented within the user credential 27, or may be derived from the flags of one or more privilege indicator 24-1, 24-2, 24-*n*.

The secure access processor 20 may comprise a logging module 36. A logging module 36 may monitor all data traffic on secure access bus 50 transmitted or received by the outward facing I/O transceiver 46 and/or the inward facing I/O transceiver 44 originating from a system administrator 12-1, 12-2, 12-*n* or transmitted to a system administrator 12-1, 12-2, 12-*n*, or responsive to an action of a system administrator 12-1, 12-2, 12-*n*. In this manner, the behavior of a system administrator 12-1, 12-2, 12-*n* within the secure access control system 10 is recorded. For instance, if the access gating engine 30 denies a system administrator 12-1, 12-2, 12-*n* access to data for which the system administrator 12-1, 12-2, 12-*n* lacks the necessary privilege indicator 24-1, 24-2, 24-*n*, the date, time, action of the system administrator 12-1, 12-2, 12-*n*, and response of the access control system 10 will be recorded. Moreover, if the coordination engine 34 denies a system administrator 12-1, 12-2, 12-*n* access to data for which the system administrator 12-1, 12-2, 12-*n* lacks the necessary concert of action with another system administrator 12-1, 12-2, 12-*n*, this interaction will also be recorded by the logging module 36. One having ordinary skill in the art will appreciate that further aspects may be logged by the logging module 36 and that the above discussed scenarios are non-exhaustive.

The secure access processor 20 may comprise a credential retrieval supervisor 38. Upon an indication by the access gating engine 30 and the coordination engine 34 that a system administrator 12-1, 12-2, 12-*n* is authorized to retrieve a user credential 27, the credential retrieval supervisor 38 may be directed by the coordination engine 34 to retrieve the user credential 27 for further processing. In various instances, the credential retrieval supervisor 38 may be the only module of the secure access processor 20 permitted to access the user facing data store 28 of the credentials database 18 for acts to retrieve a user credential 27. In this manner, the integrity of the user facing data store 28 may be enhanced, as may the security of the same data because a risk presented by unauthorized code, scripts, memory overflow exploits, etc. may be ameliorated by preventing any access to the memory space associated with the user facing data store 28 by aspects of the secure access processor 20 other than the credential retrieval supervisor 38 for acts to retrieve the user credentials 27.

The secure access processor 20 may comprise a credential change controller 40. Upon an indication by the access gating engine 30 and the coordination engine 34 that a system administrator 12-1, 12-2, 12-*n* is authorized to retrieve a user credential 27, and further upon retrieval of the user credential 27 by the credential retrieval supervisor 38, a credential change controller 40 may be directed by the coordination engine 34 to permit a system administrator 12-1, 12-2, 12-*n* to change the user credential 27. In further embodiments, it is not necessary to retrieve the credential, but rather an unretrieved user credential 27 may be changed in place by the system administrator 12-1, 12-2, 12-*n* without loading of the user credential 27. In this manner, the risk of exposure of the user credential 27 value is ameliorated.

For example, the access gating engine 30 and coordination engine 34 may indicate that a system administrator 12-1, 12-2, 12-*n* is authorized to access an administrator facing data store 26 of the credentials database 18 and retrieve a record associated with a user credential 27 located in the user facing data store 28 of the credentials database 18. The system administrator 12-1, 12-2, 12-n may transmit an instruction to change the user credential 27 and may transmit a new value for the user credential 27. The system administrator 12-1, 12-2, 12-n may transmit an instruction to reset the user credential 27 to a default value and may transmit a reset instruction. This instruction is received by the outward facing I/O transceiver 46 of the secure access processor 20, which then forwards the instruction on the secure access bus 50 to the credential change controller 40. The credential change controller 40 then may interoperate with the user facing data store 28 to change or reset the value of the user credential 27 stored therein. In various instances, the credential change controller 40 may be the only module of the secure access processor 20 permitted to access the user facing data store 28 of the credentials database 18 for acts to change the user credentials 27. In this manner, the integrity of the user facing data store 28 may be enhanced, as may the security of the same data because a risk presented by unauthorized code, scripts, memory overflow exploits, etc. may be ameliorated by preventing any access to the memory space associated with the user facing data store 28 by aspects of the secure access processor 20 other than the credential change controller 40 for acts to change the user credentials 27.

The secure access processor 20 may comprise a credential reversion engine 42. Upon an indication by the access gating engine 30 and the coordination engine 34 that a system administrator is authorized to reset a user credential 27, and further upon retrieval of the user credential 27 by the credential retrieval supervisor 38, a credential reversion engine 42 may be directed by the coordination engine 34 to permit a system administrator 12-1, 12-2, 12-n to revert the user credential 27 to a prior value or reset the user credential 27 to a default or automatically selected value. In further embodiments, it is not necessary to retrieve the user credential 27, but rather an unretrieved user credential 27 may be changed in place by the system administrator 12-1, 12-2, 12-n without retrieval by the credential retrieval supervisor 38. In this manner, the risk of exposure of the user credential 27 is ameliorated.

For example, the access gating engine 30 and coordination engine 34 may indicate that a system administrator 12-1, 12-2, 12-n is authorized to access an administrator facing data store 26 of the credentials database 18 and retrieve a record associated with a user credential 27 located in the user facing data store 28 of the credentials database 18. The system administrator 12-1, 12-2, 12-n may transmit an instruction to revert the user credential 27 to a previous value, regardless of whether the system administrator 12-1, 12-2, 12-n does or does not know that value, or to revert the user credential 27 to a default value. The system administrator 12-1, 12-2, 12-n may transmit an instruction to reset the user credential 27 to a default value or to a previous value and may transmit a reset instruction. This instruction is received by the outward facing I/O transceiver 46 of the secure access processor 20, which then forwards the instruction on the secure access bus 50 to the credential reversion engine 42. The credential reversion engine 42 then may interoperate with the user facing data store 28 to revert the value of the user credential 27 stored therein. In various instances, the credential reversion engine 42 may be the only module of the secure access processor 20 permitted to access the user facing data store 28 of the credentials database 18 to revert the user credential 27. In this manner, the integrity of the user facing data store 28 may be enhanced, as may the security of the same data because a risk presented by unauthorized code, scripts, memory overflow exploits, etc. may be ameliorated by preventing any access to the memory space associated with the user facing data store 28 by aspects of the secure access processor 20 other than the credential reversion engine 42 for acts to revert the user credentials 27.

The secure access processor 20 may comprise a limited access electronic resource supervisor 58. Upon an indication by the access gating engine 30 and the coordination engine 34 that a system administrator 12-1, 12-2, 12-n is authorized to access private data 17, the limited access electronic resource supervisor 58 may be directed by the coordination engine 34 to access the private data 17 for further processing. In various instances, limited access electronic resource supervisor 58 may be the only module of the secure access processor 20 permitted to access the limited access electronic resource 16. In this manner, the integrity of the limited access electronic resource 16 may be enhanced, as may the security of the same data because a risk presented by unauthorized code, scripts, memory overflow exploits, etc. may be ameliorated by preventing any access to the memory space associated with the limited access electronic resource 16 and the private data 17 by aspects of the secure access processor 20 other than the limited access electronic resource supervisor 58.

In further instances, upon an indication by the access gating engine 30 and the coordination engine 34 that a system administrator 12-1, 12-2, 12-n is authorized to retrieve private data 17, the limited access electronic resource supervisor 58 may be directed by the coordination engine 34 to retrieve the private data 17 for further processing and/or transmission to the system administrator 12-1, 12-2, 12-n. In various instances, limited access electronic resource supervisor 58 may be the only module of the secure access processor 20 permitted to access the limited access electronic resource 16 and/or retrieve private data 17. In this manner, the integrity of the limited access electronic resource 16 may be enhanced, as may the security of the same data because a risk presented by unauthorized code, scripts, memory overflow exploits, etc. may be ameliorated by preventing any access to the memory space associated with the limited access electronic resource 16 and the private data 17 by aspects of the secure access processor 20 other than the limited access electronic resource supervisor 58.

In various embodiments, a limited access electronic resource supervisor 58 may be directed by the coordination engine 34 to permit a system administrator 12-1, 12-2, 12-n to change the private data 17. In some instances, it is not necessary to retrieve the private data 17, but rather unretrieved private data 17 may be changed in place by the system administrator 12-1, 12-2, 12-n without loading of the private data 17. In this manner, the risk of exposure of the private data 17 is ameliorated. In association with changing the private data 17, the system administrator 12-1, 12-2, 12-n may transmit an instruction to change the private data 17 and may transmit a new value for the private data 17. This instruction is received by the outward facing I/O transceiver 46 of the secure access processor 20, which then forwards the instruction on the secure access bus 50 to the limited access electronic resource supervisor 58. The limited access electronic resource supervisor 58 then may interoperate with the limited access electronic resource 16 to change the value of the private data 17 stored therein.

For further example of what the limited access electronic resource supervisor 58 may do, upon an indication by the access gating engine 30 and the coordination engine 34 that a system administrator 12-1, 12-2, 12-n is authorized to reset the private data 17 to a default value, a limited access electronic resource supervisor 58 may be directed by the coordination engine 34 to permit a system administrator 12-1, 12-2, 12-*n* to revert the private data 17 to a prior value regardless of whether the administrator does or does not know that value or reset the private data 17 to a default or automatically selected value. In further embodiments, it is not necessary to retrieve the private data 17, but rather unretrieved private data 17 may be reset or reverted in place by the system administrator 12-1, 12-2, 12-*n* without retrieval by the limited access electronic resource supervisor 58. In this manner, the risk of exposure of the private data 17 is ameliorated. The system administrator 12-1, 12-2, 12-*n* may transmit an instruction to reset the private data 17 to a default value or to a previous value and may transmit a reset instruction. This instruction is received by the outward facing I/O transceiver 46 of the secure access processor 20, which then forwards the instruction on the secure access bus 50 to the limited access electronic resource supervisor 58. The limited access electronic resource supervisor 58 then may interoperate with the limited access electronic resource 16 to reset or revert the value of the private data 17 stored therein. In various instances, the limited access electronic resource supervisor 58 may be the only module of the secure access processor 20 permitted to access the private data 17 of the limited access electronic resource 16 to reset or revert the private data 17. In this manner, the integrity of the limited access electronic resource 16 may be enhanced, as may the security of the private data 17 because a risk presented by unauthorized code, scripts, memory overflow exploits, etc. may be ameliorated by preventing any access to the memory space associated with the limited access electronic resource 16 by aspects of the secure access processor 20 other than the limited access electronic resource supervisor 58 for acts to reset or revert private data 17.

The secure access processor 20 may comprise an inward facing I/O transceiver 44. An inward facing I/O transceiver 44 may receive communication from the outward facing I/O transceiver 46 or may transmit communication to the outward facing I/O transceiver 46. In various embodiments, the inward facing I/O transceiver 44 and the outward facing I/O transceiver 46 are logical partitions of the same transceiver.

In this manner, communication originating outside of the secure access processor 20 may be isolated from the secure access bus 50. For instance, communication received from a user device 4, a system administrator 12-1, 12-2, 12-*n* of a system administrator set 8, or any other origin may propagate through the communication interface 6 to the secure access processor 20. This communication transits in or out of the outward facing I/O transceiver 46. The outward facing I/O transceiver 46 is further configured to reject malformed data, data not intended for the secure access processor 20, hostile data such as data attempting to exploit the operative principles, security weaknesses, etc. of a system or device encompassing the secure access processor 20, and the like. The outward facing I/O transceiver 46 forwards communication properly destined for aspects of the secure access processor 20 to the inward facing I/O transceiver 44 which propagates the communication to the secure access bus 50.

Furthermore, the inward facing I/O transceiver 44 may be permitted to communicate with other aspects of the secure access processor 20 while the outward facing I/O transceiver 46 may be denied from communicating with any aspect of the secure access processor 20 except for the inward facing I/O transceiver 44. Thus, the inward facing I/O transceiver 44 may receive communication from the outward facing I/O transceiver 46 and forward it the secure access bus 50. Similarly, the inward facing I/O transceiver 44 may receive communication from other aspects of the secure access processor 20, as well as from aspects connected thereto, such as an administrative privileges database 14, a credentials database 18, and a limited access electronic resource 16 and forward it to the secure access bus 50, such as for eventual communication to other aspects or to the outward facing I/O transceiver 46.

In yet further embodiments, one or more of the administrative privileges database 14, the credentials database 18, and the limited access electronic resource 16 is connected to the secure access processor 20 by a network upon which other devices may exchange traffic. In such case, the outward facing I/O transceiver 46 rather than the inward facing I/O transceiver 44 may transceiver data between the secure access bus 50 and/or the other aspects of the secure access control system 10 and the one or more of the administrative privileges database 14, the credentials database 18, and the limited access electronic resource 16 connected via the mentioned network.

The secure access processor 20 may comprise a notification engine 48. In various embodiments, it may be desirable to notify the user of the actions or inactions of the secure access control system 10, such as in response to a user device 4, an access session 5, a system administrator 12-1, 12-2, 12-*n* of the system administrator set 8, and/or aspects of the secure access processor 20, the administrative privileges database 14, the credentials database 18, and/or the limited access electronic resource 16. The notification engine 48 may also notify one or more system administrator 12-1, 12-2, 12-*n* of the acts or attempted acts of other system administrator(s) 12-1, 12-2, 12-*n*, such as to permit an authorization challenge and response that authorizes or denies the act or attempted act, or such as to provide notifications simply for informational purposes. In some instances, the notification engine 48 refrains from notifying the user 3, user device 4, and access session 5 of the acts or attempted acts of one or more system administrator 12-1, 12-2, 12-*n*, so that system administrators 12-1, 12-2, 12-*n* may operate with a first concert of action to access the private data 17 within the limited access electronic resource 16 without the user 3, user device 4, and access session 5 being aware of the access.

The notification engine 48 may transmit via communication interface 6 a communication to a user device 4 and/or system administrator 12-1, 12-2, 12-*n*. The transmission may be scheduled, or may be unscheduled. The transmission may be pushed to the user device 4 and/or system administrator 12-1, 12-2, 12-*n* or may be retrieved by the user device 4 and/or system administrator 12-1, 12-2, 12-*n* at a time selected by the user device 4 and/or system administrator 12-1, 12-2, 12-*n*.

The transmission may comprise a visual display on a user-readable display. In various instances, the visual display further comprises an instruction to rearrange elements depicted on a user-readable display, such as by translating them spatially, or removing focus, or sending to the background, various elements depicted on the user-readable display, so that the transmission is readable. The transmission may further comprise an instruction to display text, or images, or play sounds, or vibrate, or illuminate an indicator, and/or the like to communicate the nature of the message embodied in the transmission.

In various embodiments, the notification engine 48 comprises one or more APIs, communication protocols, and/or the like configured to enable communication with a variety of different user devices 4 or system administrators 12-1, 12-2, 12-n running different software or instantiating varying access sessions 5. For instance, an access session 5 comprising a silent terminal session between the user device 4 and the secure access processor 20 such as to effectuate an automatic process may be associated with a user notification comprising a direction to create or modify an electronic log. In further instances, the access session 5, such as an active interaction with a user 3, may be associated with a visual or audio cue.

Figure 3:
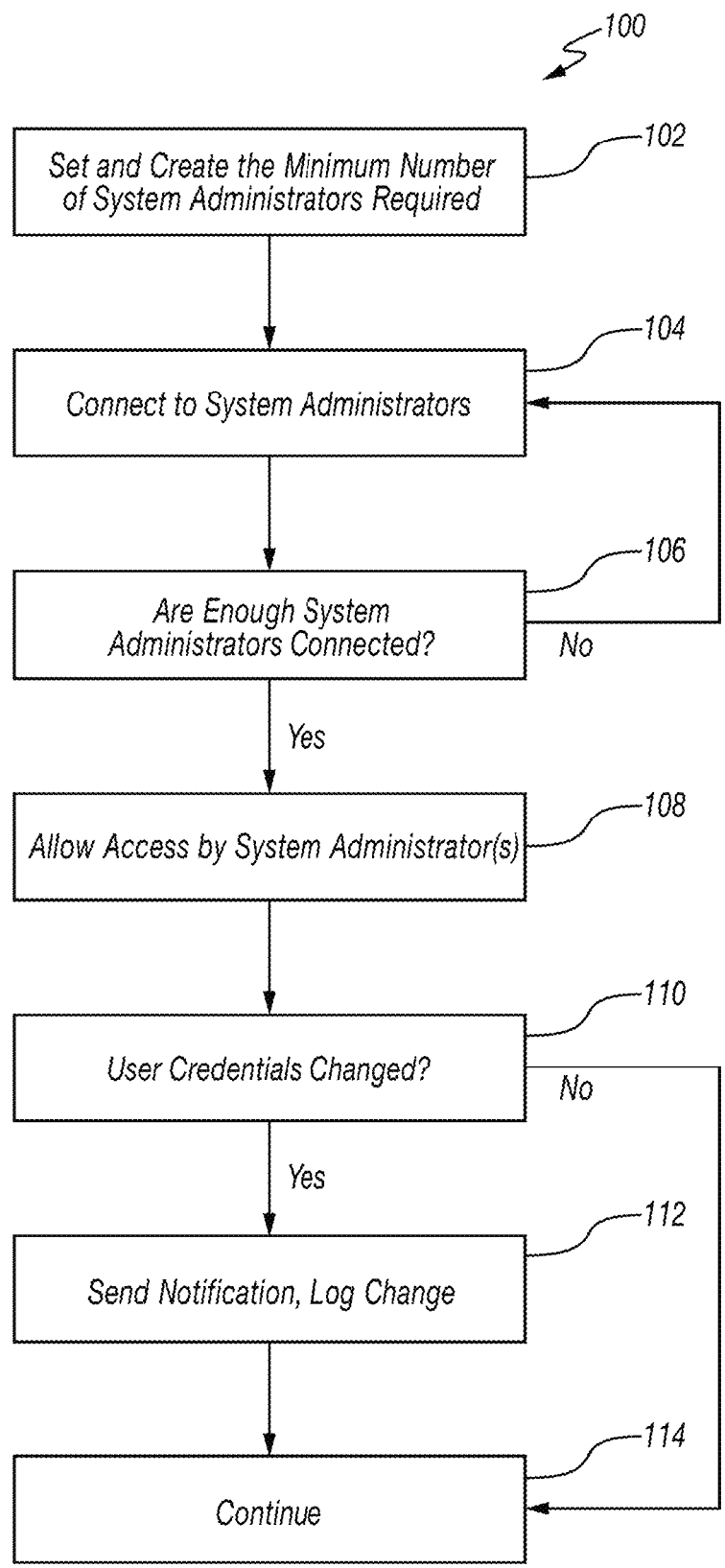
FIG. 3 illustrates a method of secure access control, according to various embodiments.

Referring now to FIGS. 1-2 as well as FIG. 3, this plurality of engines, modules, controllers, transceivers and/or the like may be structured and arranged to perform a method of secure access control 100.

A method of secure access control 100 may comprise creating a set of system administrators 8 comprising system administrators 12-1, 12-2, 12-n. In addition, the preset minimum number of system administrators 12-1, 12-2, 12-n who must act in concert to satisfy the administrator counter 56 of the privilege coordinator 54 is set (the minimum Administrator Integrity Count). In various instances, setup step 102 is performed by bus controller 52 of the secure access processor 20, though in further instances it may be performed other aspects of the secure access processor 20 or may be loaded directly to the secure access processor 20 by an initial external set up device.

As system administrators 12-1, 12-2, 12-n connect (e.g., "log in") to the secure access control system 10 (step 104), a number of system administrators 12-1, 12-2, 12-n is authenticated to the secure access control system 10, such as being connected to the secure access processor 20 (step 104) and verified as having an associated data access rule 15-1, 15-2, 15-n in the administrative privileges database 14 by the access gating engine 30 and/or by the authentication module 32 (step 104). The number of system administrators 12-1, 12-2, 12-n is counted by the administrator counter 56 of the coordination engine 34 as reaching the preset minimum number of system administrators 12-1, 12-2, 12-n needed for a particular action (e.g., reaching the Administrator Integrity Count) (step 106). If the preset minimum number" of system administrators 12-1, 12-2, 12-n are not authenticated to the system and/or are not authenticated to access or change a user's account or data at step 106 (e.g., fewer than the Administrator Integrity Count) then the system loops back to step 104 until the process is aborted or the Administrator Integrity Count is reached (the preset minimum number of system administrators 12-1, 12-2, 12-n are authenticated) at step 106. In various embodiments the system administrator set 8 comprises N system administrators 12-1, 12-2, 12-n, where N equals the Administrator Integrity Count. In instances wherein a challenge and response is presented to one or more system administrator 12-1, 12-2, 12-n to authorize or deny the attempted act of another system administrator 12-1, 12-2, 12-n, or in the instance of bifurcated tokens and/or bitmasks, N may be relatively small, whereas in further instances, N may be desired to be large such as when additional system administrators 12-1, 12-2, 12-n are simply notified of the attempted act, rather than required to actively interact with the secure access control system 10. In further instances, these principles are combined such that a bifurcated aspect of a bitmask and/or token is provided automatically by the additional connected system administrator 12-1, 12-2, 12-n in combination with the provision of notification(s).

In response to the preset minimum number of system administrators 12-1, 12-2, 12-n being connected (e.g., the Administrator Integrity Count is satisfied), then one or more of the system administrators 12-1, 12-2, 12-n may access or change a user's account (e.g., user credential 27) or data (e.g., private data 17) (step 108). Various embodiments may include features whereby certain system administrators 12-1, 12-2, 12-n may only access a user's account (e.g., user credential 27) or data (e.g., private data 17) via a credential retrieval supervisor 38, while other system administrators 12-1, 12-2, 12-n may only be allowed to change a user's account (e.g., user credential 27) via a credential change controller 40, and other can access a user's account (e.g., user credential 27) or data (e.g., private data 17) within a limited access electronic resource 16 via a limited access electronic resource supervisor 58. Various embodiments may include features whereby still further system administrators 12-1, 12-2, 12-n may revert a user's account (e.g., user credential 27) to a previous value via a credential reversion engine 42 or data (e.g., private data 17) to a previous value via a limited access electronic resource supervisor 58. After the preset minimum number of system administrators system administrators 12-1, 12-2, 12-n is authenticated (e.g., the Administrator Integrity Count is satisfied), at step 106, one or more of the system administrators 12-1, 12-2, 12-n may access the user account (e.g., user credential 72) or data (e.g., private data 17), including, for example, cloud storage and/or may change a user account (e.g., user credential 72) as their own privilege indicator 24-1, 24-1, 24-n permits at step 108. When the one or more authenticated system administrators 12-1, 12-2, 12-n with the appropriate privilege indicator 24-1, 24-1, 24-n access, change, reset, and/or revert the user's account (e.g., user credential 27) or data (e.g., private data 17), a notification message, such as email, text or the like, may be sent to designated system administrators 12-1, 12-2, 12-n, users 3, user devices 4, access sessions 5, and/or other designees via the notification engine 48 (step 112).

If the user's account (e.g., user credential 27) or data (e.g., private data 17) has been changed, the method of secure access control 100 may further log information relating to the change, via a logging module 36 (step 112). Such logging may include storing the date, time and nature of the change in a secure table that may be available for inspection by credentialed (e.g., authorized) system administrators 12-1, 12-2, 12-n. As an on-going process, the method of secure access control 100 may examine the user account (e.g., user credential 72) at step 110 to determine whether the user account (e.g., user credential 72) has been changed. If the user account (e.g., user credential 72) has not been changed, the method of secure access control 100 may continue normal operation at step 114 (e.g., return to step 110).

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, the term "communication interface," such as with respect to communication interface 6 provided in FIG. 1 includes any RS232 serial interface (Terminal interface), USB, network, cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Visa®, Google®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; utility company data; institution data; regulatory agency data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as determining or selecting, which are commonly associated with mental operations performed by a human operator. No such capability of a human operator is necessary, possible, or desirable in most cases, in any of the operations described herein. Rather, the operations may be machine operations not performable by mere human activity.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs) are implemented. Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://nvlpubs.nist.gov/nistpubs/Legacy/SP/nistspecialpublication800-145.pdf (last visited March 2017), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, popup window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or the like, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory, processor-readable storage media may be any available media that may be accessed by a computer. By way of example, and not limitation, such non-transitory, processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A secure access control system, comprising:
   a secure access processor, comprising hardware and coupled to a non-transitory computer readable storage medium, configured to:
      set a minimum number of an Administrator Integrity Count of the secure access control system,
      real-time detect how many system administrators are currently connected to the secure access processor against the minimum number of the Administrator Integrity Count,
      verify a data access rule for each of the system administrators currently connected to the secure access processor in an administrative privileges database by an access gating engine of the secure access control processor;
      count, by an administrator counter of a coordination engine of the secure access control processor, the system administrators, and determine whether a count of the system administrators currently connected to the secure access control system is at least the minimum number of the Administrator Integrity Count in order to perform a concert of action, and
      when the minimum number of the Administrator Integrity Count is reached, issue a first authorization in response to the concert of action between a first system administrator connected to the secure access processor and one or more second system administrators connectable to the secure access processor,
   wherein the first authorization comprises authorizing the first system administrator to access a secured data associated with at least one of a user, a user device, and an access session,
   wherein the concert of action comprises a notification message received by the secure access processor from the one or more second system administrators,
   wherein the notification message comprises an indication of the first authorization, and
   wherein the first authorization is denied in response to the one or more second system administrators connectable to the secure access processor not being connected to the secure access processor.

2. The secure access control system according to claim 1, wherein the secured data comprises electronic mail.

3. The secure access control system according to claim 1, wherein the secured data comprises a limited access electronic resource comprising electronic cloud data storage.

4. The secure access control system according to claim 1, wherein the first authorization is granted in response to receiving by the secure access processor the notification message from the one or more second system administrators.

5. The secure access control system according to claim 1, wherein the accessing the secured data by the first system administrator comprises changing a user credential in the secured data.

6. The secure access control system according to claim 1, wherein the accessing the secured data by the first system administrator comprises resetting a user credential in the secured data.

7. The secure access control system according to claim 1, wherein the secure access processor issues the first authorization in response to the concert of action, the concert of action including a secure access control method comprising:
   authenticating the system administrators to the secure access control system.

8. The system according to claim 7, wherein the first authorization further comprises permitting the first system administrator to change the secured data and further in response to the determining notifying the one or more second system administrators of the permitting.

9. The system according to claim 7, wherein the first authorization further comprises permitting the first system administrator to access a user credential in the secured data via a credential change controller.

10. The system according to claim 7, wherein the first authorization further comprises permitting the first system administrator to access a limited access electronic resource via a limited access electronic resource supervisor.

11. The system according to claim 8, wherein the first authorization further comprises permitting the first system administrator to revert a user credential in the secured data to a previous value via a credential reversion engine.

12. The system according to claim 8, wherein the first authorization further comprises logging, via a logging module, a change to a user credential.

* * * * *